[11] 3,609,540

[72] Inventors Herbert Lashinsky
Bethesda;
Robert E. Monblatt, Bowie, both of Md.
[21] Appl. No. 15,400
[22] Filed Mar. 2, 1970
[45] Patented Sept. 28, 1971
[73] Assignee Research Corporation
New York, N.Y.

[54] RASTER DISPLAY METHOD AND APPARATUS
17 Claims, 8 Drawing Figs.
[52] U.S. Cl. ................................................. 324/77 G,
324/88
[51] Int. Cl. ......................................... G01n 23/16
[50] Field of Search ............................. 324/77, 88;
343/11; 315/18

[56] References Cited
UNITED STATES PATENTS
3,329,894   7/1967   Asbury et al. .................. 324/77

*Primary Examiner*—Edward E. Kubasiewicz
*Attorneys*—Robert S. Dunham, P. E. Henniger, Lester W. Clark, Gerald W. Griffin, Thomas F. Moran, R. Bradlee Boal, Christopher C. Dunham, Robert Scobey and Ivan S. Kavrukov

ABSTRACT: Method and apparatus for displaying current and past characteristics of substantially periodic information which may have very low signal-to-noise ratio in a manner enhancing perception by the human eye. An example of such information is the output of a spectrum analyzer using in plasma studies. Also, method and apparatus for converting an oscilloscope which conventionally presents a dependent variable as a function of time into an X-Y plotter which presents the same dependent variable as a function of another variable which is independent. An inherent desirable feature is automatic adjustment of correspondence between full scale of the dependent variable and full-scale excursion of independent variable.

The information of interest is displayed in a raster created on a CRT oscilloscope having a long decay-time screen or by a time-exposure photograph on a standard camera attachment by externally triggering the horizontal sweep in harmonic relationship with the cycle of periodic information, stepping the vertical deflection incrementally in harmonic relationship with the same cycle, and using the periodic information for either beam-intensity modulation or vertical deflection modulation. The resulting display is in the form of a raster of horizontal scan lines in which noise appears as randomly distributed indicia while the periodic information produces an easily perceptible to the human eye ordered set of indicia. In a first application, the raster display is a plot of the periodic information in two time domains: the horizontal axis is a measure of the time of occurrence of the periodic information within a cycle, and the vertical axis is a measure of the number of cycles of occurrence. Perfectly periodic information signals produce a vertical line made up of individual indicia, while a drifting information signal produces a sloping line made up of individual indicia. The slope is a measure of the instantaneous rate of drift.

In a second application, the raster display is a plot of a dependent variable versus an independent variable, which plot is not in the time domain. The raster-display thus serves as an X-Y plotter.

The signal-to-noise ratio of the information signal may be enhanced by operating in dwell mode in which horizontal scans are repeated while the total number of displayed scan lines remains constant. Particular advantages derive from provisions for: fast advance and reset of the raster building circuit so that a partially completed experiment can be terminated and the raster display returned to initial state quickly; generating exceedingly stable staircase voltage so that a scan line taking several seconds can remain straight; indicating the current scan line position—useful when the camera attachment obscures the screen; protection of the raster from accidental erasure; automatically controlled camera operation; and automatic beam intensity adjustment when switching between using the periodic information for beam-intensity modulation.

INVENTORS
HERBERT LASHINSKY
BY ROBERT E. MONBLATT

ATTORNEY

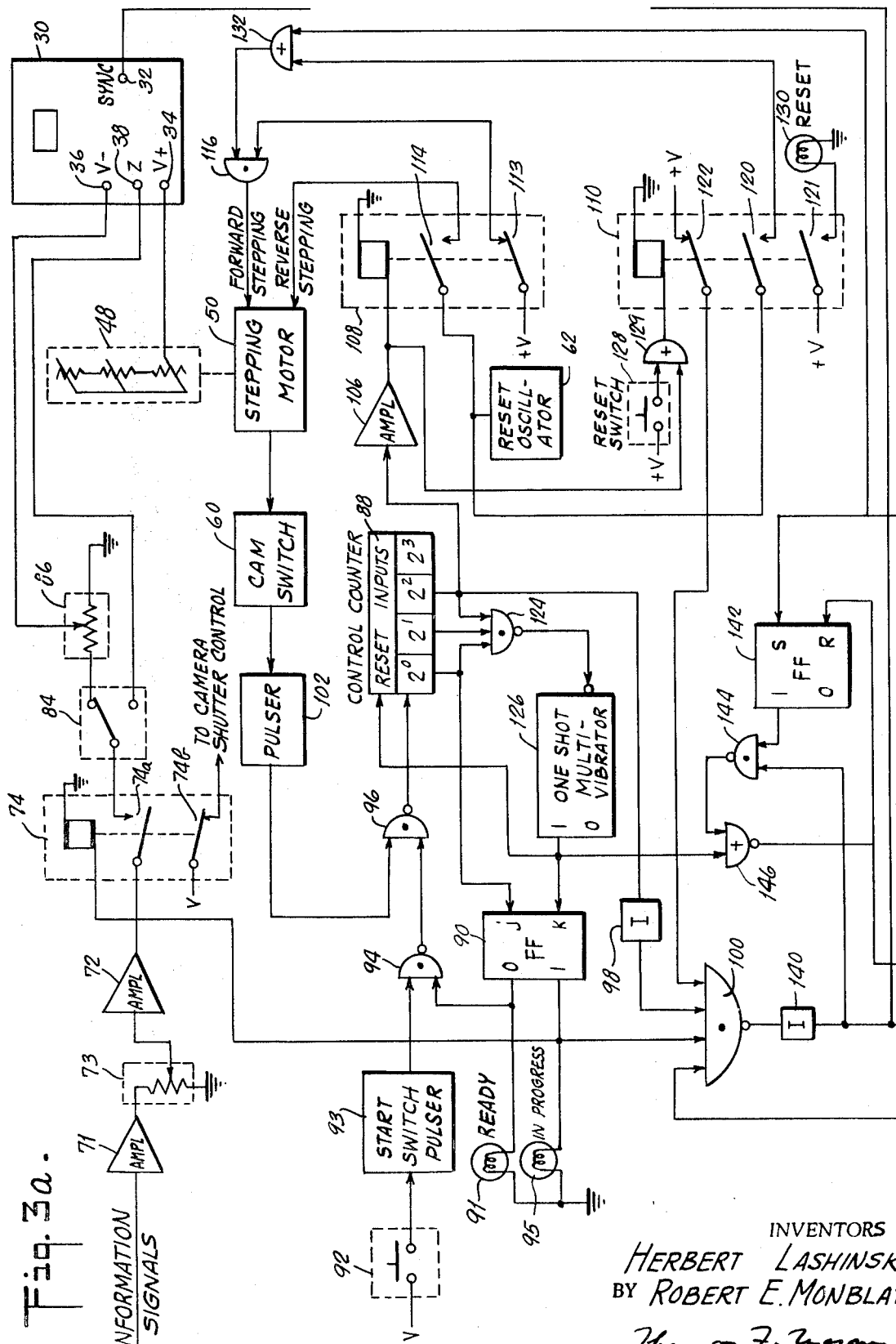

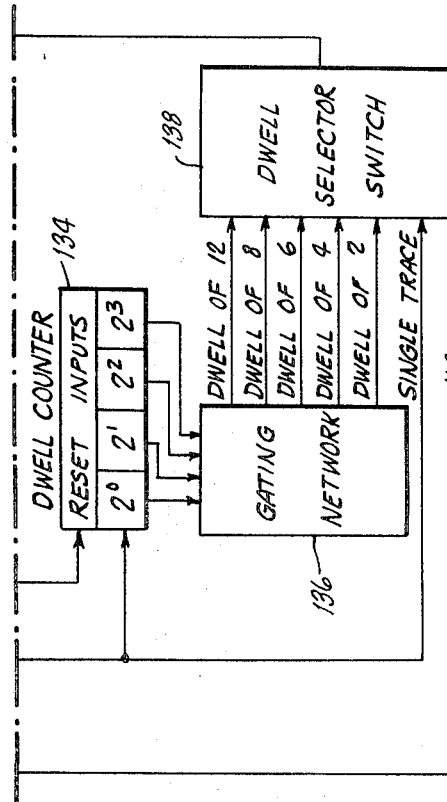
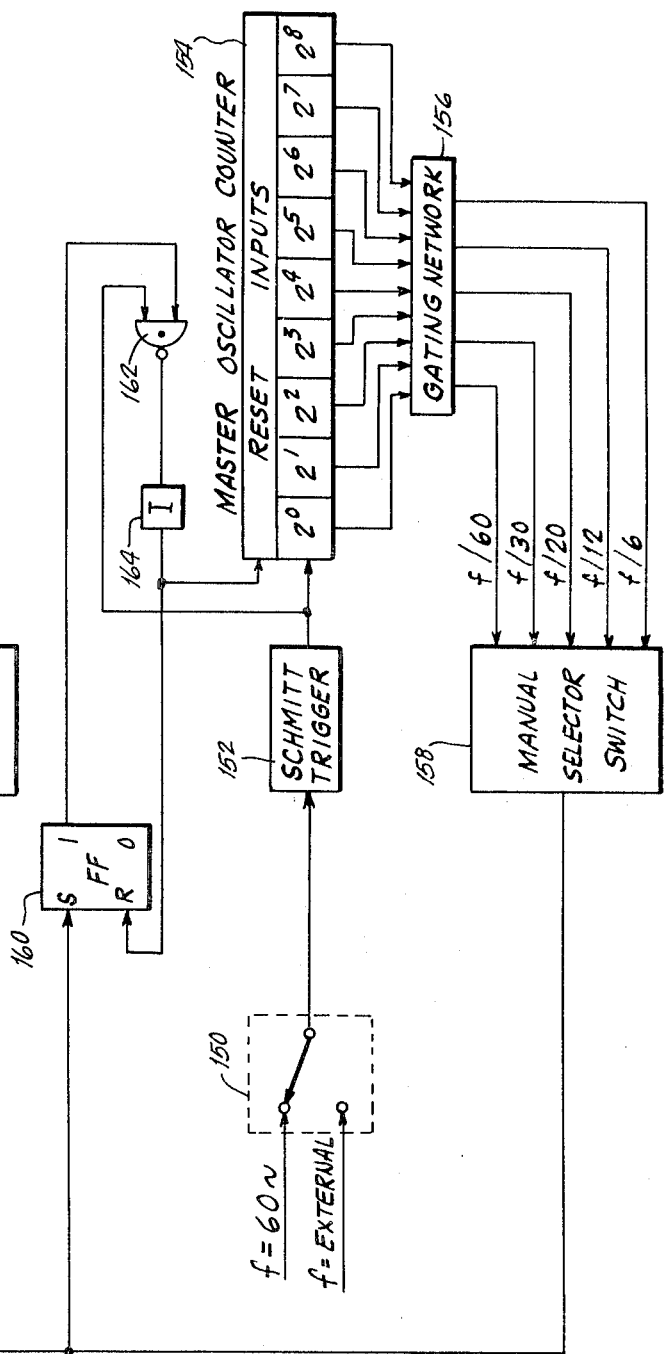

RASTER DISPLAY METHOD AND APPARATUS

BACKGROUND OF THE INVENTION

The invention is in the field of signal display devices. In one particular aspect, it is in devices for displaying and for recording the output of a spectrum analyzer, while in a general aspect it is in devices for displaying and for recording any substantially periodic signals which may have very low signal-to-noise ratio, such that both the current status and the history over a period of time of the signals are displayed in a manner enhancing perception by the human eye. In another particular aspect, when signal-to-noise ratio does not present problems, the invention is in a device useful as an X–Y plotter to display a plot of a dependent variable versus an independent variable, which plot is not in the time domain.

Presently, periodic signals of very low signal-to-noise ratio can be identified by means of fairly sophisticated machines operating on the principles of special purpose digital computers, such as the Hewlett-Packard Signal Analyzer Model 5480A (see Hewlett-Packard Journal, Apr. 1968, Volume 19, No. 8). Starting with a synchronizing pulse, such devices sample a periodic information signal at a fixed sampling rate. Each sampled value is stored, in digital form, in a separate memory address, one for each sample-slot. Pursuant to a subsequent synchronizing pulse, newly sampled values are algebraically added to the value that has been previously stored in the memory address associated with the proper sample-slot. Statistically, the stored values resulting from the periodic information signals grow at a faster rate than the stored values resulting from noise signals. Devices of this type identify and measure accurately information signals which are perfectly periodic, but may not be adequate in the case of drifting information signals, because they may not be able to distinguish a drifting information signal from a noise burst.

Periodic information signals can also be identified by means of a CRT oscilloscope displaying a manually adjusted raster of vertically stacked horizontal scan lines traced by an intensity modulated beam (see Asbury et al., U.S. Pat. No. 3,329,894). Such devices perform well when the cycle of the information signal is known and the horizontal sweep time can be manually adjusted to correspond to a harmonic of the information signal cycle. However, it may be difficult to locate and display an information signal whose cycle is unknown, particularly if it is not certain that an information signal exists at all. Since there is no synchronization between the cycle of the information signal and the horizontal sweep, manual adjustments must be made for changed cycle times and for drift. There is no provision for repeating scan lines so as to enhance signal-to-noise ratio of the displayed signal, and there are no provisions for fast return to the start of the raster in case the experiment generating the information signal is terminated before the raster is completed.

A similar display device (Bartelink, U.S. Pat. No. 2,756,417) uses the pulses from a radar transmitter for externally triggering the horizontal sweeps of a CRT oscilloscope, and steps up the vertical deflection for every two rotations of a scan-radar receiving antenna. The device performs well for its intended use, but may not be suitable for displaying a broad range of types of periodic information signals, because it has no flexiblity for accommodating different information signals and different conditions. For example, it has no provision for horizontal triggering at adjustable harmonics of the information; no provisions for repeating scan lines to enhance signal-to-noise ratios; no provisions for generating highly stable stepping voltage for the purpose of accurately tracing a scan line17 taking a few seconds or more; and no provisions for fast return to initial condition from a partially completed raster.

Other similar prior art devices are described in an article by Webb & Rogers entitled *The Contourograph* and published in the IEEE Spectrum of June 1966, page 77 et seq.; and in a paper entitled *Universal Instability in a Thermal Plasma Devices* by H. Lashinsky, published at page 44 et seq. of volume 1 of "Plasma Physics and Controlled Nuclear Fusion Research," International Atomic Energy Agency, Vienna 1966. These devices provide little of the flexibility and convenience of operation inherent in the invented display apparatus.

SUMMARY OF THE INVENTION

The invention is in method and apparatus for displaying contemporaneously current and past characteristics of substantially periodic information signals which may have very low signal-to-noise ratio in a manner enhancing perception by the human eye and in method and apparatus useful to generate an X–Y plot of a dependent variable versus an independent variable, which plot is not in the time domain.

The display is carried out by apparatus which is relatively simple in operation and relatively inexpensive when compared with other devices carrying out similar functions, but provides great flexibility and convenience for accommodating different types of information signals and for accommodating different types of experiments generating such information signals.

In one particular embodiment, the invented apparatus is for use in conjunction with a spectrum analyzer, and comprises a CRT oscilloscope modified by circuitry which triggers the horizontal sweep of the oscilloscope in harmonic relationship with the synchronization signal which triggers the spectrum analyzer sweep frequency generator, such that one horizontal scan line may selectively display the results occurring during one or more cycles of the spectrum analyzer sweep frequency generator. The vertical deflection of the oscilloscope is modified to be stepped incrementally in harmonic relationship to the spectrum analyzer synchronizing signal, such that each scan line is spaced from the preceding scan line by one line width, and a raster of scan lines is formed. The raster may be retained by a CRT which has a long decay-time screen, or the face of the standard CRT may be photographed by means of a conventional camera attachment operating in time exposure mode.

In a mode of operation of the invented apparatus called "Intensity Modulation Mode," the information signal generated by the spectrum analyzer is used to modulate the beam intensity of the oscilloscope such that the presence of a pulse signal is indicated by a bright spot on the CRT face. In this Intensity Modulation Mode, a perfectly periodic information signal results in a vertical line of dots which is easily distinguished visually from the random background of dots which may be more pronounced but which are statistically randomly distributed because they result from noise signals. A drifting recurrent information signal appears as a sloping line of dots; the slope is a measure of the rate of drift.

In another mode of operation called "Vertical Deflection," the difference is that the beam is not intensity modulated, but instead, the information signal from the spectrum analyzer is used to modulate the vertical deflection of the oscilloscope. The vertical deflection modulation is superimposed on the incremental vertical stepping forming the raster.

In a third mode of operation called "Dwell MOde" scan lines are repeated selectively two or more times for the purpose of enhancing signal-to-noise ratio.

The usefulness of the invented apparatus is particularly improved by various novel features which facilitate easier operation nd provide great flexibility in accommodating different types of information signals and different types of experiments. Such features include: a provision for fast reset to the initial scan line from any point along the raster in order to enable an operator to restart an experiment without waiting for normal formation of and complete raster which may take up to 10 minutes; a provision for fitting selectively a number of cycles in a single scan line; a provision for independently selecting the dwell time of a scan line; a provision for indicating the position of the scan line which is being currently formed so as to enable an operator to follow the raster formation even when the CRT screen is obscured by a camera attachment; a provision for switching between Vertical Deflection Mode and Intensity Modulation Mode without the usual necessity of readjusting the beam intensity; a provision for generating and maintaining exceedingly stable staircase voltage in order to facilitate the formation of stable scan lines that may take up to 10 seconds each, and for making this staircase voltage available to external units; use of this staircase voltage as an independent variable to govern a dependent variable in a mode of operation of the raster display in which it serves as an X-Y plotter of the dependent versus the independent variable, with the time domain excluded; inherent automatically adjustment of the full range of the independent variable to correspond to full range of the dependent variable; a provision for automatic shutter control of a camera attachment; a provision for using the aster forming signals to control external experiments; and provisions for wide range of controls of the raster forming circuits.

BRIEF DESCRIPTION OF THE DRAWING

FIGS. 3a and 3b, which fit together as shown in FIG. 3, are a more detailed schematic of an embodiment of the invention.

DETAILED DESCRIPTION

FIG. 1

Figure 1A:
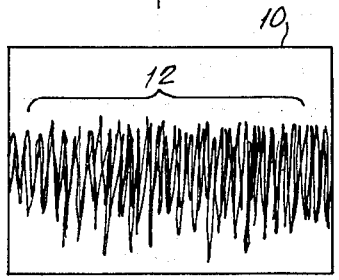
FIGS. 1a, 1b, 1c and 1d illustrate respectively: a display of a low signal-to-noise ratio signal by conventional oscilloscopic techniques; a display of similar signals by the invented method and apparatus in Intensity Modulation Mode; a display of similar signals by the invented method and apparatus in Vertical Deflection Mode; and a display of a dependent versus an independent variable when the invented apparatus is used as an X-Y plotter.

In conventional oscilloscopic displays, information having low signal-to-noise ratio, such as the information at the output of a spectrum analyzer which is usually a composite waveform including information signals and possibly stronger noise signals, may look like the illustrative waveform of FIG. 1a. In FIG. 1a, a rectangle 10 represents the contours of a CRT face, and the multiple tracings generally indicated at 12 are tracings resulting from superimposed noise and information signals over one or more cycles of an information signal.

Clearly, it is not possible to distinguish the information signals from the noise signals in a display of this type, because both are displayed in a manner in which amplitude is the determining feature. The only distinguishing feature, however, is not amplitude but statistical distribution of the two types of signals in the time domain over a number of cycles of the information signal. For each substantially periodic information signal, there are particular times of occurrence within a particular time span. For white noise signals, which are inherently random in the time domain, there are no particular times of occurrence and there is no such particular time span.

On the basis of the statistical distribution distinction, substantially periodic information signals can be detected on a conventional CRT oscilloscope by displaying one cycle or a small fixed number of cycles of the substantially periodic information signal repeatedly, by separately photographing each display, and by superimposing and comparing the several individual photographs to detect visually any signal traces which appear to the present in all or nearly all of the photographs. This process, even if successful, is wasteful both in terms of time and in terms of film expense.

If, however, the same statistical distribution distinction is utilized in building a display raster of the type generated by the invention apparatus, one cycle or several cycles of a substantially periodic information signal may be displayed in a single scan line, and a number of substantially nonoverlapping successive scan lines may be fitted on the CRT face. There is no need to look at a number of individual photographs in attempting to detect a repetition; all needed information is contained in a single photograph (or in a single view of a long decay-time CRT).

Figure 1B:
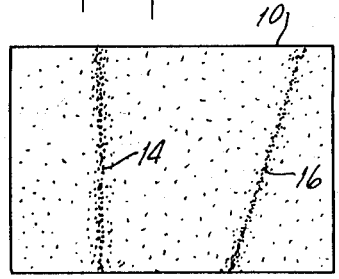

In the Intensity Modulation Mode of the invented apparatus, the display of a pair of information signals, one perfectly periodic and the other one steadily and slowly drifting toward lower frequency, may look like the illustrative view of FIG. 1b where the reference numeral 10 again denotes the contours of a CRT face. The perfectly periodic information signal appears as a vertical line 14 composed of individual dots; the drifting information signal appears as a sloping line 16 composed of individual dots; and noise signals appear as randomly distributed dots on the CRT face. Although it may be complicated and difficult to detect the same information signals by correlation function computations nd considerations, the human eye is able to perceive their presence easily, by means of a process that is not understood, but is clearly superior to presently developed machine reading methods.

Figure 1C:
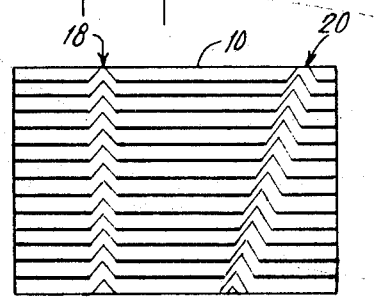

In the Vertical Deflection Mode, a display of the same pair of information signals may look like the illustration of FIG. 1c. The perfectly periodic information signal appears as a column 18 in which the speed of the tracing beam is generally higher than in the areas 20 in which the beam is only sporadically modulated by noise (high tracing speed means lighter trace).

Figure 1D:
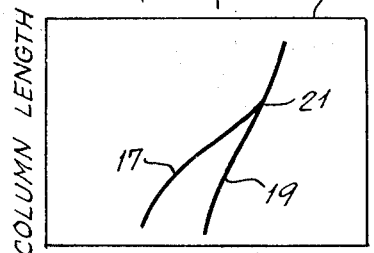

When the invented apparatus is used as an X-Y plotter, the synchronizing signal which initiates the horizontal scan lines is used as an independent variable to control an external parameter which governs a dependent variable. For example, the synchronizing signal may be used to increment or decrement the length of a plasma column in a Q-machine; the column length governs the frequency of column oscillation. The raster display is then a plot having as its Y-axis the length of the plasma column (the independent variable), and having as its X-axis the frequency of oscillation of the plasma column. An X-Y plot of this type is illustrated in FIG. 1d where the rectangle 10 represents the contours of a CRT face, the Y-axis is the frequency of oscillations of the plasma column. A curve 17 represents an oscillation of the plasma column whose frequency is a function of column length, and a curve 19 represents another simultaneous oscillation which merges in frequency with the curve 17 at a point 21.

The plot of FIG. 1d is a vast improvement in convenience over the conventional method of obtaining plots of this type which involves individually measuring pairs of coordinate values at individual settings of the independent variable, and then constructing a composite curve from a multiplicity of pairs of coordinate values.

A plot such as the one of FIG. 1d may be constructed by operating the raster display either in the Intensity Modulation Mode or in the Vertical Deflection Mode Dwell Mode.

FIGURE 2

Figure 2:
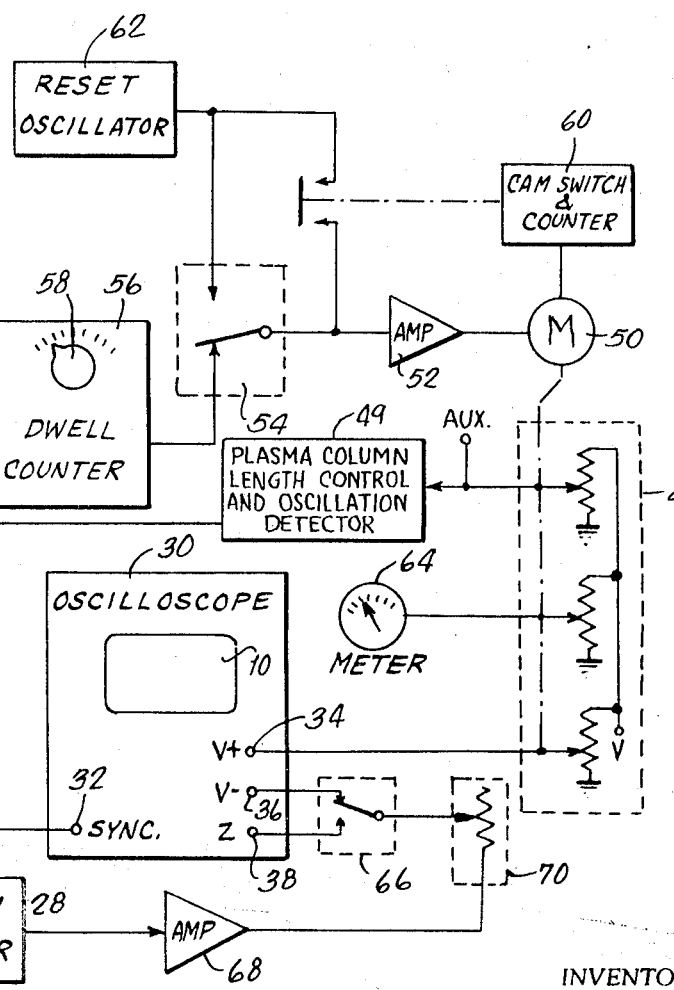
FIG. 2 is a block schematic of the principal components of an embodiment of the invention.

In FIG. 2, which is a generalized functional diagram, the invented apparatus is shown in conjunction with a conventional spectrum analyzer 24 which has an output 26 for the synchronizing signals triggering the conventional sweep frequency generator of the analyzer (not shown) and an output 28 for the information signals generated by the spectrum analyzer. The information signals are usually in a composite waveform containing periodic information signals as well as random noise signals whose amplitudes may be greater than the amplitude of the information signals.

A conventional CRT oscilloscope 30 has an external sync input 32 for receiving synchronizing signals serving to initate horizontal sweeps of the beam, an external vertical deflection input 34 for receiving staircase voltage positioning the beam along the vertical axis of the CRT face, a vertical deflection modulation input 36 and a beam intensity modulation input 38.

In building a raster of scan lines, the external sync input 32 of the oscilloscope 30 may be triggered either by the sync output of the spectrum analyzer 24 or a subharmonic thereof, or by powerline frequency or a subharmonic theory, as determined by the position of a selector switch 40. The sync signals at the output of the switch 40 are processed by a frequency divider 42 whose purpose is to determine how many cycles are to be displayed in a single scan line. The frequency divider 42 has a rotary selector switch 44 for selecting one of a predetermined plurality of subharmonics of the synchronizing signal from he switch 40. The output of the frequency divider 44 is applied to the external sync input 32 of the oscilloscope 30 and is also available for use by other equipment at a sync-out connector 46.

The vertical position of a scan line is determined by a staircase voltage applied to the input 34 of the oscilloscope 30 from one of the three ganged sections of a precision pot 48. The precision pot 48 is driven incrementally by a reversible stepping motor 50 which rotates along a fixed arc when stepped by a pulse from a motor amplifier 52. While the raster display is being generated, a switch 54 connects the input of the motor amplifier 52 to the output of a dwell counter 56 which determines how many times a scan line is to be retraced. The dwell counter 56 receives as its input the signals from the output of the frequency divider 42. Each new signal at the output of the amplifier 52 initiates a tracing of a horizontal scan line. If the dwell counter 56 puts out a signal for each output signal for the frequency divider 42, then a scan line is traced only cone before the motor 50 causes the beam to move to the next scan line. But if the dwell counter 56 puts out an output signal once for every two output signals from the frequency divider 42, then a scan line is traced twice, etc. A manual rotary selector switch 58 determines the ratio between the frequencies of the input and the output signals of the dwell counter 56.

As the motor 50 steps up the voltage at the oscilloscope input 34, the raster progress is being monitored by a cam switch and counter 60 which detects the motor position corresponding to completed raster and, at that time, connects the motor amplifier 52 to a reset oscillator 62 for the purpose of driving the motor 50 in the reverse direction at a fast rate to return the precision pot 48 to a position which sets the beam at the initial scan line.

If at any time during an experiment it is decided to terminate the raster display and move to initial beam position, the selector switch 54 can be manually tripped to connect the reset oscillator 62 to the motor amplifier 52 in order to drive the raster display forward to completion at fast rate. Once the raster is completed, at either slow or fast rate, reset is automatic.

The instantaneous beam position in the raster is indicated by a meter 64 driven by another of the three ganged sections of the precision pot 48.

The remaining section of the pot 48 can be used for providing staircase voltage to control external devices.

As one example the staircase voltage can be used as an independent variable to control the length of a plasma column in a Q-machine by incrementally increasing or decreasing the column length as by use of a stepping motor. The dependent variable may be the frequency of an oscillation of the plasma column. The frequency of this oscillation is a function of the plasma column length. The frequency of oscillation of the plasma column is detected by the spectrum analyzer 24 and applied to the oscilloscope 30 either in the Vertical Deflection Mode or in the Intensity Modulation Mode. The resulting raster display is a plot of plasma column length (along the Y-axis of the screen) versus frequency of oscillation of the plasma column (along the X-axis of the screen). The plot is known as a dispersion relation for the particular plasma wave. A plot for a range of column lengths is generated in a single raster, without the need, as in the prior art, of point-by-point plotting where the coordinates of each point are obtained from individual photographs or individual measurements of column length and frequency for that column length.

The information signal output of the spectrum analyzer 24 is applied either to the vertical modulation input 36 or to the beam intensity modulation input 38 of the oscilloscope 30, as determined by the position of a manually operated selector switch 66. The information signal is amplified by a conventional video amplifier 68 and is selectively attenuated by means of a variable attenuator 70 which, as is described in detail later, is automatically controlled to avoid manual readjustments when switching between the inputs 36, and 38 of the oscilloscope 30 (i.e., when switching between Vertical Deflection Mode and Intensity Modulation Mode). Thus, an embodiment of the subject invention may be combined with a conventional spectrum analyzer to provide a display surface in the form of the screen of a CRT oscilloscope and a recording point in the form of the CRT beam as it strikes the screen to cause indicia distinguished from the rest of the screen by the degree of brightness. The indicia may be temporary, as determined by the CRT decay time, or they may be permanent if a camera attachment is used in conjunction with the oscilloscope and the indicia are recorded on film.

A first characteristic of the recording point, as for example the beam position along the horizontal axis, is caused to scan repetitively through a range of values (e.g., the beam is caused to trace horizontal scan lines). A second characteristic of the recording point, as for example vertical beam position, is changed incrementally (e.g., the beam is stepped up vertically). Each change in these characteristics is initiated in harmonic relationship with synchronizing signals generated by the spectrum analyzer (e.g., each horizontal scan is started at each, or at each second, or at each fourth, etc. synchronizing signal; each vertical stepping takes place at each, or at each second, or at each fourth, etc. synchronizing signal). A characteristic of the recording point is modulated by the information signals (e.g., the beam intensity is modulated in the Intensity Modulation Mode, or the vertical deflection is modulated in the Vertical Deflection Mode of operation).

The invention apparatus is also highly useful as an X-Y plotter in situations when signal-to-noise problems are not prevalent. As one example of using the invented apparatus as an X-Y plotter, the initiating signals used for stepping the vertical displacement of the oscilloscope 30 may be used to control an independent process parameter and the values of a dependent process parameter may be used as the information signals in either the Vertical Deflection Mode of operation or the Intensity Modulation Mode of operation of the invented apparatus.

In reference to FIG. 2, one of the three ganged sections of the precision pot 48 has an output labeled "AUX" (for anxiliary and an output applied to a process controller 49 which may be a conventional device for varying the length of a plasma column in a conventional Q-machine as a function of the voltage of an applied input signal. For example, the length of the plasma column may be increased by a constant increment for each increase by a given increment of the voltage at the output of the precision pot 48. The length of the plasma column governs the frequency of oscillation of the column; the length of the column is an independent process parameter and the frequency of oscillation of the column is a dependent process parameter which varies as a function of the independent parameter. The controller 49 also includes means for detecting the plasma column oscillations and for generating a modulating signal as a function of the frequency of the oscillation, which modulating signal is applied, through the spectrum analyzer 28, to the switch 66 which determines if the modulation signal would be used as an information signal in the VErtical Deflection Mode or as an information signal in the beam Intensity Modulation Mode of the dwell apparatus. The raster display generated in this manner is an X-Y plot of the independent process parameter (the length of the plasma column) versus the dependent process parameter (the frequency of oscillation of the plasma column).

In operating the invented apparatus as an X-Y plotter, periodic synchronization signals are generated either by the spectrum analyzer 24 or by an external source such as a power line, and these synchronization signals are used by the frequency divider 42 and the dwell counter 56 to generate a series of initiating signals occurring in harmonic relationship to the synchronization signals. Each of the initiating signals causes the stepping motor 50 to move by one increment; the movement causes the precision pot 48 to increment the value at a first control signal which is the pot output going to the vertical deflection input 34 of the oscilloscope 30, and to increment the value of a second control signal which is the output of the precision pot 48 going to the controller 49. A harmonic of the initiating signals, which is also a harmonic of the synchronization signals, is taken from the output of the frequency divider 42 and applied to the externally triggered horizontal sweep input 32 of the oscilloscope 30. The combination of the signals at the inputs 32 and 34 of the oscilloscope 30 creates a raster of vertically displaced horizontal scan lines.

The controller 49 which is labeled in FIG. 2 "Plasma Column Length Control and Oscillation Detrector," varies the independent process parameter (the plasma column length) as a function of the control signal from the precision pot 48, and detects the dependent precess parameter (the frequency of the oscillation of the plasma column) to a generate a modulation signal which is a function of the detected dependent parameter. The modulation signal is applied, through the spectrum analyzer 24, to the switch 66 which serves to selectively apply the modulation signal either to the beam intensity input 38 or to the vertical beam deflection input 36 of the oscilloscope 30 for the purpose of modulating the beam creating the raster to thus cause a raster display representing a plot of the independent versus the dependent process parameters. There may be two or more simultaneous oscillations in the plasma column; FIG. 1d is in fact a representation of a first continuous oscillation and of a second oscillation which is at first distinct but later merges in frequency with the first oscillation.

The invented apparatus is useful as an X-Y plotter for any process in which an independent parameter is varied as a function of the value of an applied signal derived from the auxiliary output of the precision pot 48, and in which the values of a parameter varying as a function of that independent parameter can be detected and supplied to the spectrum analyzer 28 or directly to the oscilloscope 30 to serve as information signals.

FIGURES 3a and 3b

The detailed block schematic of FIGS. 3a and 3b (which fit together as indicated in FIG. 3) represents a particular apparatus embodying the invention. Many of the circuit components are conventional and commercially available; therefore they are described by function only, and it should be clear that other conventional components capable of carrying out the same logical functions under equivalent conditions may be used instead (as, for example, certain gates may be used instead of certain relays, and vice versa, so long as the signal processing obeys the same logical equations).

In the circuit of FIGS. 3a and 3b, the information signals (e.g. spectrum analyzer output) which may be mixed with noise are amplified by a pair of operational amplifiers 71 and 72 which also provide impedance matching. The amplifiers are separated by a variable impedance 73 used for manual gain control.

The amplified and impedance matched information signal from the output of the amplifier 72 is grounded at normally open contacts 74a of a relay 74 while the raster is being reset so as to prevent damaging the displayed raster by modulation of the beam during resetting. As explained later, the coil of the relay 74 is energized only during forward raster formation so that only then is the information signal applied through relay contacts 74a to a manual selector switch 84 which determines if the information signal is to be used in the Vertical Deflection Mode or in the intensity Modulation Mode without further readjustments.

The relay 74 also has contacts 74b which are used to control an oscilloscope camera attachment. When the coil of the relay 74 is deenergized (when the raster is being reset) the camera's shutter is closed to prevent undesirable film exposure; the camera's shutter is open only during forward raster formation when the coil of the relay 74 is energized.

A control counter 88 is used to monitor the start and end of the forward raster formation, and the end of the raster resetting.

When the invented apparatus is ready to start generating a raster, the counter 88 and a $jk$ flip-flop 90 have been reset to their 0 states, a READY indicator light 91 has been turned on by the 1 at the negation output of the flip-flop 90, a manual start switch 92 is off, the output of a start switch pulser 93 is 0, the inputs to a NAND-gate 94 are 0 and 1 so that its output is 1, and the inputs to a NAND-gate 96 are 1 and 1 so that its output is 0.

To start raster generation, the start switch 92 is turned on to trigger the start switch pulser 93. Now the inputs to the NAND-gate 94 are 1 and 1 and its output changes to 9, and the inputs to the NAND-gate 96 are 0 and 1 so that its output changes to 1 to trigger the counter 88 and to set its lowest order stage to state 1. The 1 output of that lowest order stage triggers the $j$ input of the $jk$ flip-flop 90 to set it to its 1 state, with the following four consequences:

a. an IN PROGRESS Light 95 is turned on by the 1 output of the flip-flop 90 to indicate that the apparatus is in the process of building up a raster, b. the input to the NAND-gate 94 from the negation output of flip-flop 90 is now 0 so that an accidental tripping of the manual start switch 92 can not affect the control counter 88 and can not disturb the raster that is in progress, c. the READY indicator light 91 is turned off, and d. input of a NAND-gate 100 from the 1 output of the flip-flop 90 is changed to 1.

The output of the NAND-gate 100 is ultimately used to step the motor 50 which drives the precision pot 48 positioning the scan lines vertically to build up a raster.

As the stepping motor 50 is being driven forward, it rotates through a complete revolution for every 200 scan lines, and trips a cam switch 60 for each such complete revolution. The cam switch triggers a cam switch pulser 102 whose output triggers the NAND-gate 96 to apply another countup pulse to the control counter 88.

The raster is composed of about 600 scan lines and is completed after three revolutions of the stepping motor 50. The revolutions trip the cam switch 60 three times and cause three additional counts in the counter 88 which already has accumulated one count from the start switch 92. At the count of four in the control counter 88, the $2^2$ order counter stage is turned on to its 1 state and the NAND-gate 100 is disabled, (it can only have a 1 output), because its input from the $2^2$ counter stage (as inverted by inverter 98) is now 0. At the same time the same 1 from the output of the $2^2$ of the counter 88 is shaped by an amplifier 106 and energizes simultaneously the coils of relays 108 and 110. b The purpose of the relays 108 and 110 is to stop the forward stepping of the motor 50 which caused the raster buildup and to start stepping the motor 50 in the reverse direction at high speed in order to bring the precision pot 48 quickly to initial state in which the CRT beam is at the level of the initial scan line of the raster.

The forward stepping of the motor 50 is discontinued when contacts 113 of the relay 108 open to disable an AND-gate through which the forward stepping pulses from the dwell selector switch 138 must pass to reach the forward stepping input of the motor 50; simultaneously, contacts 114 of the same relay close to apply the high-frequency output of a reset oscillator 62 to the reverse stepping input of the motor 50 which starts driving the ganged precision pot 48 toward the position corresponding to the initial scan line of the raster. The reset oscillator 62 may operate at about 130 pps; at that frequency the return from completed raster to initial scan line takes less than 5 seconds.

Contacts 122 of the relay 110 are open at this time, and the NAND-gate 100 is disabled (its output can not drop to 0. Thus, the dwell counter 124 does not change its contents, nd no output pulses appear at the output of the dwell selector switch 138 to drive the motor 50 forward.

Contacts 120 of the relay 110 are now closed, but the pulses from the output of the reset oscillator can not reach the forward stepping input of the motor 50 because the AND-gate 116 is disabled (at this time the relay 108 is also energized and its contacts 113 are open).

Contacts 121 of the relay 110, which are now closed, turn on a RESET indicator lamp 130.

As the motor 50 is reverse driven, it continues tripping the cam switch 60 once for each revolution and drives the control counter 88 to the count of 7 after three revolutions in the 7 direction.

The completion of three revolutions in the reverse direction means that the raster display is reset to the initial scan line, the drive in the reverse direction must be stopped, and that an indication must be given that the apparatus is ready to start building a new raster. The count of 7 in the control counter 88 (which in binary code is a 1 in each of the first three stages) is detected by a NAND-gate 124 which changes its output from 1 to 0 and triggers a 1-shot multivibrator 126 by a dropping pulse at its negative input. The rising pulse at the output of the multivibrator 126 resets each stage of the control counter 88 to zero, and also resets the jk flip-flop 90 to its zero state.

As the flip-flop 90 goes to its zero state, the IN PROGRESS Light 95 connected to its 1 output is turned off and the READY light 91 connected to its negation output is turned on to indicate that the apparatus is ready to start a new raster. The NAND-gate 100 is disabled because its input from the 1 output of the flip-flop 90 is now at 0.

If at any time during the raster formation it is decided that the raster should be terminated and the apparatus returned to READY state, it would be desirable to carry out the return to initial state at a faster rate than that afforded by waiting for normal completion of the raster and automatic reset upon the count of 4 in the control counter 88. A provision is made therefore for fast reset from any point along the raster.

Fast reset from incomplete raster is initiated by closing a reset switch 128 which connects, through an OR-gate 129, a voltage source to the coil of the relay 110 to energize it. Now contacts 120 of the relay 110 close to apply the high-frequency output of the oscillator 62 to the forward stepping input of the motor 50 through an OR-gate 132 while the and-gate 116 which is on because the relay 108 is still deenergized and its contacts 113 are still closed. Note that the opening of contacts 122 disables the NAND-gate 100 and thus there are no pulses at the dwell selector switch 138 output. The RESET light 130 is turned on by the closing of contacts 121 of the relay 110.

The motor 50 is thus driven forward at a fast rate, and—when the count in the control counter 88 reaches 4—the automatic resetting operation described above is initiated and proceeds in the manner described above. It is noted that during automatic resetting (i.e. after there is a count of 4 in the control counter 88), the and-gate 116 is disabled because contacts 113 of the relay 110 are open; thus no forward stepping pulses can reach the motor 50.

It may be desirable to retrace scan lines one or more times, usually at decreased beam intensity, in order to enhance signal-to-noise ratio of the displayed information signals. The number of times scan lines are retraced is controlled by a circuit including a serial binary dwell counter 134, a gating network 136, and selector switch 138. The NAND-gate 100 is enabled (its output changes from 1 to 0) once at the start of each tracing of a scan line to trigger the external sync input 32 of the oscilloscope 30. The output of the NAND-gate 100 is applied through on inverter 140 to the countup input of the dwell counter 134 and simultaneously to one of the inputs of the selector switch 138. If the selector switch 138 is set to connect that input to its output, then the motor 50 is stepped up for each scan line tracing, and each scan line is traced only once. However the selector switch 138 has six other inputs which provide respectively a signal for each 2, 4, 6, 8, 10 or 12 pulses at the output of the NAND-gate 100 such that the motor 50 may selectively be stepped up only once for each 2, or 4, etc. tracings of a scan line. The combination of the dwell counter 134 and the gating network 136 is essentially a frequency divider providing the indicated submultiples of the counter input.

The dwell counter 134 must be reset to its zero state after the tracing of a scan line is completed and the beam is to be stepped up to the next scan line. The resetting network includes a RS-type flip-flop 142 which is set each time a pulse appears at the output of the dwell selector switch 138 and is reset at the coincident 0 pulse at the output of the NAND-gate 100, as detected by a NAND-gate 144 and a NOR-gate 146. The output of the NOR-gate 146 also resets the dwell counter 134.

Each tracing of a scan line is initiated by a synchronization pulse which may be derived either from a 60 Hz. power line frequency or from an external synchronization signal source, as determined by a manual selector switch 150. If the invented apparatus is used in conjunction with a spectrum analyzer, then the source of external synchronization pulses may be the spectrum analyzer sync output. The output of the selector switch 150 is suitably shaped by a Schmitt trigger 152 and applied, as frequency $f$, to the countup input of a master oscillator counter 154 which is a 9 serial binary counter. The master oscillator counter 154 is combined with a gating network 156 such that the combination delivers at the input of a selector switch 158 the following submultiples of the frequency of: one-sixth, one-twelfth, one-twentieth, one-thirtieth, and one-sixtieth. The output of the selector switch 158 is applied to the NAND-gate 100 to enable it once for each sync pulse at that output during raster formation.

The output of the selector switch 158 is also used to reset the master oscillator counter 154 by a network including an RS-type flip-flop 160 which is set by the output of the selector switch 158 and is reset at the coincident pulse from the Schmitt trigger 152 as detected by a NAND-gate 162. The output of the NAND-gate 162 resets the master oscillator counter 154 to its 0 state through an inverter 164.

We claim:

1. A spectrum analyzer including a sweep frequency oscillator, a source of synchronizing signals for initiating sweeps of the oscillator, and a source of information signals which may occur substantially periodically within the sweep of the oscillator, but may be of very low signal-to-noise ratio, wherein the improvement is in a device for displaying said information signals in a visually identifiable manner, comprising:

a. a display surface;

b. a recording point for causing at least temporary physical indicia on the display surface;

c. means for initiating repetitive continuous scans through a range of values of a first characteristic of the recording point in harmonic response to the spectrum analyzer synchronizing signals;

d. means for causing incremental changes in the value of a second characteristic of the recording point in harmonic response to the spectrum analyzer synchronizing signals and;

e. means for modulating a characteristic of the recording point as a function of the information signals and the noise in which the information signals may be mixed;

whereby noise is represented by randomly distributed indicia on the display surface while the information signals are represented by indicia which are in a visually identifiable substantially ordered set.

2. A spectrum analyzer as in claim 1 including, in the means of subparagraph (d) dwell means for causing said incremental changes in response to a preselected number of consecutive synchronizing signals.

3. A spectrum analyzer as in claim 2 including in said dwell means settable selector means for selecting the number of consecutive synchronizing signals forming said preselected number.

4. A spectrum analyzer as in claim 1 including fast advance means responsive to a control signal for causing incremental changes in said second characteristic at a faster rate than the rate of change caused by the means of subparagraph (d)

5. A spectrum analyzer as in claim 1 including indicator means responsive to the number of incremental changes caused by the means of subparagraph (d) for indicating the current value of said second characteristic of the recording point.

6. A spectrum analyzer as in claim 1 including means for causing a process control characteristic of the spectrum analyzer to vary as a function of the aggregate of the incremental changes in said second characteristic of the recording point.

7. A spectrum analyzer as in claim 1 wherein
said display surface is the screen of a conventional CRT oscilloscope, said recording point is the beam of said CRT as it strikes the CRT screen, said first characteristic is the horizontal deflection of the beam, and said second characteristic is the vertical deflection of the beam.

8. Apparatus for displaying in a visually identifiable manner information signals which may be in a composite waveform with noise exceeding their magnitude, comprising:
   a. a source of periodic synchronization signals;
   b. a source of information signals which may occur substantially periodically within time spans defined by said synchronization signals;
   c. a cathode ray tube oscilloscope including an externally triggered horizontal sweep circuit, a vertical deflection circuit, and a beam intensity modulation circuit;
   d. means for triggering the oscilloscope horizontal sweep circuit in harmonic response to said synchronization signals to cause the beam to trace repetitively horizontal scan lines across the tube screen;
   e. means for applying incrementally changed signals to the vertical deflection circuit in harmonic response to said synchronizing signals to move the beam incrementally in the vertical direction and cause a raster of said horizontal scan lines;
   f. means for applying said information signals to the beam intensity modulation circuit to cause functional relationship between the brightness of the scanning beam and the information signals which may be mixed in noise;
   thereby creating a raster of vertically stacked horizontal scan lines in which any noise signals that may be mixed with the information signals appear as randomly distributed indicia in the form of dots on the screen, and the information signals appear as a vertical line or a sloping curve made up of such individual indicia.

9. Apparatus as in claim 8 including means responsive to the completion of a raster of a predetermined number of individual scan lines for causing the beam to be returned to the position of the initially completed scan line of that raster.

10. Apparatus as in claim 9 including means responsive to a control signal to disable the means of subparagraph (e) and to cause completion of the raster at a faster rate than the rate established by the means of subparagraph (e)

11. Apparatus as in claim 8 including means for causing retracing of each scan line a predetermined number of times. Apparatus as in claim 8 including means for indicating the relative position in the raster of the scan line currently traced by the beam.

12. Apparatus as in claim 8 including means for indicating the relative position in the raster of the scan line currently traced by the beam. (f) 13. Apparatus as in claim 8 including means for disabling the means of subparagraph (f) and for applying said information signals to the vertical deflection circuit in superimposed relationship with said incremental signals.

14. Apparatus as in claim 13 including means responsive to said means for disabling for changing the brightness level of the beam.

15. Apparatus as in claim 8 including means responsive to the start of tracing the initial scan line and to the end of tracing the final scan line of a raster to provide a shutter-opening and shutter-closing signals respectively, for respectively opening and closing the shutter of a camera attachment.

16. Apparatus as in claim 8 including:
   a. a controller for a process characterized by an independent parameter and a dependent parameter which varies as a function of said independent parameter, said controller responsive to the occurrence of initiating signals to vary incrementally said independent process parameter;
   b. means for generating said initiating signals in harmonic response to said synchronization signals;
   c. means for detecting the values of said dependent process parameter; and
   d. means for applying said detected values to said source of information signals to serve as said information signals, thereby creating a raster which is a plot of the independent versus the dependent process parameters.

17. Apparatus for displaying an X–Y plot of values of an independent parameter of a process versus the values of a dependent process parameter which varies as a function of said independent parameter including a cathode-ray tub oscilloscope having inputs for vertical beam deflection control, beam intensity control and externally triggering the horizontal beam sweep, wherein the improvement comprises:
   a. a source of a series of periodic synchronization signals;
   b. means responsive to said series of synchronization signals to generate a series of initiating signals occurring in harmonic relationship to said synchronization signals;
   c. means responsive to each of said initiating signals to increment the values of a first and second control signals;
   d. means for applying said first control signal to the vertical deflection input of the oscilloscope and means for applying a harmonic of said initiating signals to the externally triggered horizontal sweep input of the oscilloscope to create a raster of vertically displaced horizontal scan lines;
   e. means responsive to said second control signals to vary said independent process parameter as a function of said first control signal;
   f. means to detect said dependent process parameter and to generate a modulation signal which is a function of said detected dependent parameter; and
   g. means for selectively applying said modulation signal either to the beam intensity input or to the vertical beam deflection input of the oscilloscope to create a raster display representing a plot of the independent versus the dependent process parameters.

UNITED STATES PATENT OFFICE
CERTIFICATE OF CORRECTION

Patent No. 3,609,540            Dated April 24, 1972

Inventor(s) Herbert Lashinsky and Robert E. Monblatt

It is certified that error appears in the above-identified patent and that said Letters Patent are hereby corrected as shown below:

In the Abstract, line 5 (first column), delete "using" and insert -- used -- ;

line 41 (second column, next to last line), after the words "periodic information for" insert -- vertical deflection modulation and using the periodic information for --.

Column 1, line 69, delete "17".

line 74, delete "Devices" and insert -- Device --.

Col. 2, line 54, delete "Dwell MOde" and insert -- "Dwell Mode" --;

line 64, delete "nd" and insert -- and --.

Column 4, line 15, delete "nd" and insert -- and --;

line 38, after "is" insert -- the length of a plasma column 1 and the X-axis is -- ;

UNITED STATES PATENT OFFICE
CERTIFICATE OF CORRECTION

Patent No. 3,609,540          Dated April 24, 1972

Inventor(s) Herbert Lashinsky and Robert E. Monblatt    PAGE - 2

It is certified that error appears in the above-identified patent and that said Letters Patent are hereby corrected as shown below:

Column 4, line 62, after "containing" insert -- substantially -- line 66, delete "initate" and insert -- initiate -- ;

line 75, delete "theory" and insert -- thereof --.

Col. 5, line 7, delete "he" and insert -- the -- ;

line 26, delete "cone" and insert -- once --.

Col. 6, line 64, delete "VErtical" and insert -- Vertical --.

Col. 7, line 18, delete "Detrector," and insert -- Detector -- ;

line 22, after "to" delete "a".

UNITED STATES PATENT OFFICE
CERTIFICATE OF CORRECTION

Patent No. 3,609,540          Dated April 24, 1972

Inventor(s)  Herbert Lashinsky and Robert E. Monblatt    page - 3

It is certified that error appears in the above-identified patent and that said Letters Patent are hereby corrected as shown below:

Column 8, line 21, delete "9" and insert -- 0 -- ;

line 31, after "of" (first instance) insert -- the -- ;

line 65, after "AND-gate" insert -- 116 --.

Column 9, line 3, delete "nd" and insert -- the -- ;

line 15, delete "7" (second instance) and insert -- reverse -- ;

line 48, delete "and-gate" and insert -- AND-gate -- ;

line 59, delete "and-gate" and insert -- AND-gate --.

Column 10, line 28, delete "9 serial" and insert -- 9-stage -- ;

line 32, delete "of" (second instance) and insert -- f -- .

UNITED STATES PATENT OFFICE
CERTIFICATE OF CORRECTION

Patent No. 3,609,540          Dated April 24, 1972

Inventor(s) Herbert Lashinsky and Robert E. Monblatt    page - 4

It is certified that error appears in the above-identified patent and that said Letters Patent are hereby corrected as shown below:

Column 12, lines 2, 3 and 4, delete "Apparatus as in claim 8 including means for indicating the relative position in the raster of the scan line currently traced by the beam."

Signed and sealed this 22nd day of August 1972.

(SEAL)
Attest:

EDWARD M. FLETCHER, JR.      ROBERT GOTTSCHALK
Attesting Officer              Commissioner of Patents